July 9, 1957 M. DUJIC 2,798,763
CONVERTIBLE TOP
Filed Feb. 23, 1955 2 Sheets-Sheet 1
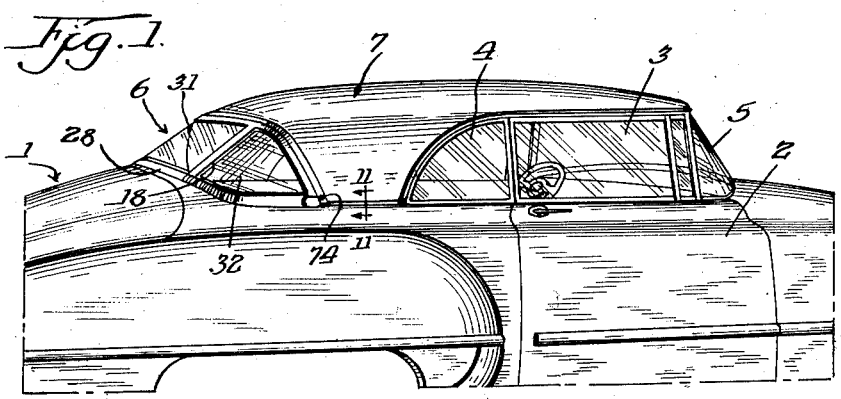
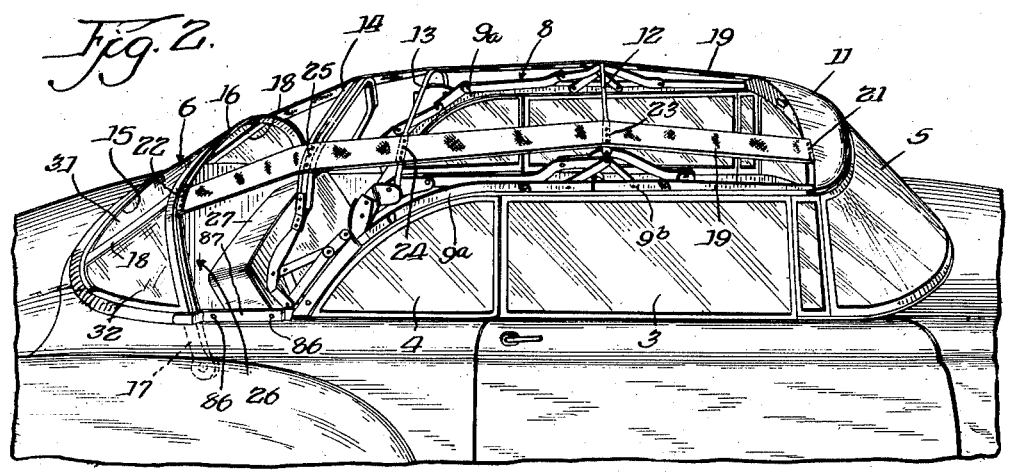
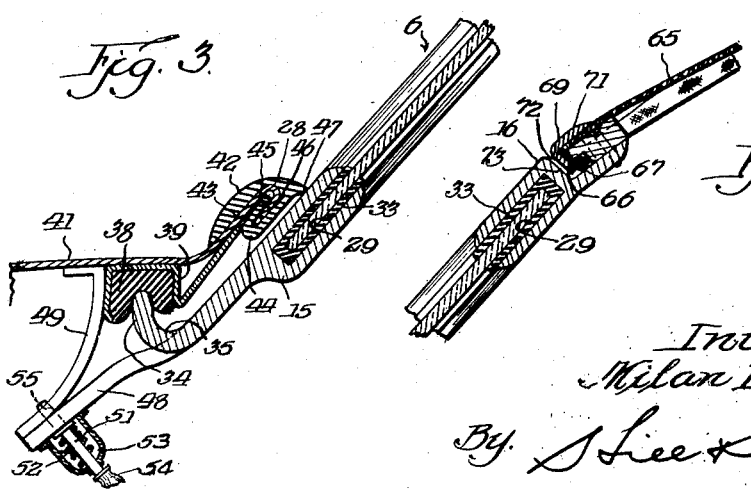
Inventor.
Milan Dujic.
By Lee & Lee
Attys.

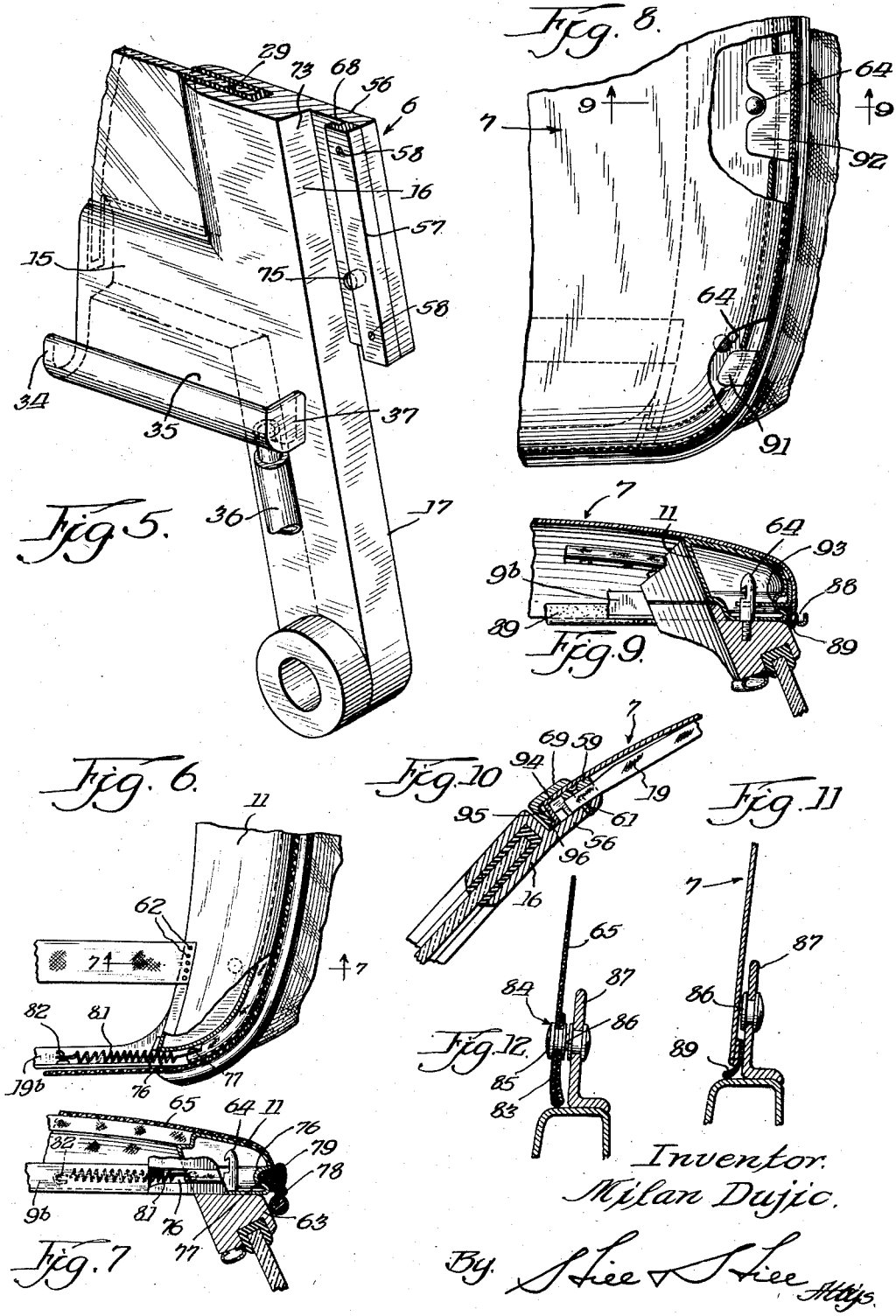

United States Patent Office 2,798,763
Patented July 9, 1957

2,798,763

CONVERTIBLE TOP

Milan Dujic, Forest Park, Ill.

Application February 23, 1955, Serial No. 489,937

4 Claims. (Cl. 296—107)

The invention relates generally to vehicle tops, and more particularly to a convertible top structure which may utilize a rigid rear window, having transparent panels of glass or plastic, such rear window being readily designed to provide a wrap-around effect and movable into a raised or lowered position with the top structure, and in which such rear window may be cooperable with either of two top members, one of fabric or other foldable material, and the second a hardtop of metal or other suitable material.

The present invention therefore has among its objects the production of a convertible top structure with which may be employed a fabric convertible top member or a rigid hardtop member, the two being interchangeable when desired.

Another object of the invention is the production of such a convertible top structure wherein the convertible and hardtop members cooperate with a movable rear window structure, which may be of the wrap-around type and forming a permanent part of the vehicle body.

Another object of the invention is the production of such a convertible top structure in which the fabric top may be readily removed from or replaced upon the vehicle body, and in which replacement of the convertible top with a new top is a simple operation easily and quickly performed by the average person.

A further object of the invention is the production of a convertible top structure having a novel rear window construction which is weatherproof, whereby the vehicle interior is protected from the elements.

A further object of the invention is the production of novel means at the front and rear edges of the convertible or hardtop units and on the front bow and rear window for detachably securing either the hardtop or the convertible top units to the vehicle body, and which is so designed that interchange may be readily accomplished.

A further object of the invention is the production of such a convertible top structure which may utilize foldable frame constructions of substantially the same type and design as currently employed in the automotive industry, the rear window being rotatable into a lowered position within the body and permitting the bow and frame elements of the top structure to be readily rotated into a lowered position within the body. Thus, no material changes are required in the design of the frame and bow structure or the actuating mechanism and linkage for folding and unfolding the top structure.

Many other objects and advantages of the construction herein shown and described will be obvious to those skilled in the art from the disclosure herein given.

To this end, my invention consists in the novel construction, arrangement, and combination of parts herein shown and described, and more particularly pointed out in the claims.

In the drawings, wherein like reference characters indicate like or corresponding parts:

Fig. 1 is a rear quarter view in perspective of a portion of a convertible car body and top structure constructed in accordance with the present invention, and illustrating the application of the hardtop unit thereto;

Fig. 2 is a perspective view of a convertible top structure with the convertible or hardtop unit removed therefrom, showing the details of the top framework, bows, and rear window;

Fig. 3 is a transverse sectional view of the lower rear portion of the rear window and associated portion of the car body.

Fig. 4 is a similar sectional view of the front or upper edge of the rear window with the convertible fabric top attached thereto;

Fig. 5 is a perspective view of the lower front or side portion of the rear window showing details of construction;

Fig. 6 is a top plan view of the front bow and associated structure with portions thereof broken away to show the details of connection of the fabric top therewith;

Fig. 7 is a sectional view taken approximately on the line 7—7 of Fig. 6;

Fig. 8 is a top plan view of a portion of the hard top adjacent the windshield of the vehicle with portions of the top structure broken away to show the connections of the hard top with the front bow;

Fig. 9 is a sectional view taken approximately on the line 9—9 of Fig. 8;

Fig. 10 is a sectional view similar to Fig. 4 taken approximately on the line of one of the pads with the hard top in place;

Fig. 11 is a transverse sectional view taken approximately on the line 11—11 of Fig. 1; and Fig. 12 is a similar sectional view with the fabric top in position.

Referring to the drawings and particularly to Figs. 1 and 2, 1 indicates generally a vehicle body of the convertible type, for the purposes of illustration, having a door 2 containing a movable window 3, a movable quarter window 4, and a windshield 5 illustrated as being of the wrap-around type, the elements thus far described being of more or less standard or usual construction and varying somewhat in size and shape with the particular make of vehicle. The body 1 is also provided with a rear window indicated generally by the numeral 6, which as illustrated may be of the wrap-around type, with the body interior being enclosed by a hard top indicated generally by the numeral 7, and as hereinafter described in detail, a convertible top of fabric or other flexible material may be substituted for the hard top 7.

Referring to Fig. 2, which illustrates the top structure prior to the installation of either the hard top or convertible top, it will be apparent that the top frame structure indicated generally by the numeral 8 is of more or less standard construction, utilizing side frame members 9a and 9b pivotally or otherwise suitably connected, the arcuate-shaped members 9a being, in turn, operatively connected to the vehicle body with the side frame members being connected by a front bow 11 and a plurality of intermediate bows 12, 13, and 14.

Pivotally supported by the body is the rear window structure 6 comprising a rear or lower top frame member 15 and an upper or front frame member 16, the latter in effect being positioned more or less similarly to the main body of the standard convertible top structure, the member 16 being generally arcuate in shape, having downwardly extending leg portions 17 which are respectively pivotally connected to the body structure at opposite sides of the latter, with the rear member 15 intersecting and being secured to the member 16. As illustrated in Figs. 1 and 2, the members 15 and 16 may be connected by dividing bars 18 which in the embodiment of the invention illustrated are shown as being more or less aligned with padding strips indicated generally by the numeral 19. Referring to Fig. 2, it will be apparent that the strips 19 are secured at their front ends as indicated at 21 to the front bow 11, and at their rear ends as indicated at 22 to the member 16 with the padding being respectively secured to the intermediate bows 12, 13, and 14 as indicated at 23, 24, and 25.

The frame members 9a and 9b and bows 11, 12, 13, and 14 may be of any suitable construction and may be operatively connected together by any suitable linkage whereby they may be lowered into the body or raised into the position illustrated in Fig. 2. The particular construction of these members and the linkage associated therewith illustrated in Fig. 2 is, for all practical purposes, substantially the same as that heretofore employed in the automotive industry, the details of which form no part of the present invention and obviously, the invention may be readily adapted to any particular construction. It will be apparent, referring to Figs. 1, 2, 3, and 5, that the rear window 6 may readily be rotated inwardly about its pivotal connection of the arms 17 with the vehicle body, the rear window being rotated in a counterclockwise direction as viewed in Fig. 2 into a suitably shaped top well indicated generally by the numeral 26 located behind the rear seat 27, such well being of a shape and size to permit the cross member 16 of the rear window to be positioned flush with or slightly below the adjacent rear edge 28 of the body compartment when the convertible top framework, bows, etc., are moved to a lowered position. As will be apparent to anyone skilled in the art, the convertible top structure comprising the frame members 9a and 9b, the respective bows and associated linkages will readily fold down into the well 26 between the lowered rear window 6 and the rear seat 27.

As illustrated in Figs. 3, 4, and 5, the members 15, 16, and 18 are provided with respective channels 29 which are operatively aligned and adapted to receive the edge portions of the center panel 31 and respective side panels 32 of the rear window 6, the panels 31 and 32 being engaged with suitable material such as a rubber gasket 33, positioned in the respective channels 29 and of a size to receive the edge portions of the associated panel whereby the latter is supported in watertight relation in the frame structure.

As illustrated in Figs. 3 and 5, the lower edge portion of the member 15 is provided with an upturned lip or shoulder 34 forming a drain gutter 35 to which is operatively connected at the respective ends thereof, drain tubes 36, the ends of the gutter being suitably closed as indicated at 37. The gutter 35 and the drains associated therewith may be constructed in any suitable manner, that shown in the drawings merely being for illustrative purposes. Cooperable with the lip or flange 34 is a soft sealing gasket 38 which in the embodiment of the invention illustrated is positioned in a suitably formed channel member 39 secured to the adjacent portion 41 of the car body. As illustrated, the member 39 is suitably secured to the car body by welding or other suitable means and the free edge of the body adjacent the member 15 may be provided with a rubber sealing strip 42 or ornamental molding or the like. In the embodiment illustrated, the strip 42 may be formed of rubber or similar material having an external portion 43 adapted to overlie the adjacent face of the body and having a U-shaped portion 44, the free edge portion 45 of which is adapted to be inserted between the car body and the reversely bent free edge portion 46 of the car body with the member 42 being provided with a sealing edge 47 adapted to bear upon the member 15 when the window 6 is in raised position. At one or more points, the member 15 may be provided with downwardly extending projections 48 cooperable with similarly fixed projections 49 extending downwardly from the portion 41 of the car body with the members 48 and 49 being provided with cooperable means for locking the same in fixed relation whereby the window 6 may be locked in its elevated position. Such means, for example, may take the form illustrated wherein the member 48 is provided with a spring-biased latch member 51, the latter being urged in a direction towards the member 49 by a compression spring 52 which is enclosed in a suitable housing 53 attached by any suitable means to the member 48. As illustrated, the end 54 may be shaped to provide a manual gripping portion while the opposite end is adapted to enter a bore 55 in the member 49. The construction preferably is such that when a window 6 is raised to its fully elevated position the latch member 51 will automatically drop into locking position, and when it is desired to lower the window the latch members may be manually disengaged from the members 49.

The member 16 may be suitably formed along its front or forward edge for engagement with the convertible or hard top as well as provided with means for receiving the adjacent ends of the padding 19. As illustrated in Figs. 4, 5, and 10, the member 16 is provided with a forwardly extending flange 56 on which is mounted an L-shaped retainer strip 57, the latter in the embodiment illustrated being secured to the flange 56 by screws 58 extending through the strip 57 and threaded into the flange 56. In the embodiment of the invention illustrated, the retaining strip 57 is fabricated as a plurality of individual pieces, one piece extending between the two padding strips 19 and the other pieces each extending from the outer edge of the adjacent padding strip to adjacent the lower end of the member 16, with the spaces between the respective pieces or sections being of a size approximately equal to the width of the strips 19, the free ends of which may therefore be positioned in the space between the retaining strips and secured to the member 16 by a retaining plate 59 overlying the free end of the respective padding strip 19 and secured to the member 16 by a plurality of screws 61 extending through the plate 59 and threaded into the flange 56 of the member 16. The opposite ends of the padding strips 19 may be secured to the front bow 11 by any suitable means as, for example, tacks 62 passing through the padding and into suitable tacking strips carried by the front bow. As illustrated generally in Figs. 7 and 9, the front bow 11 may be detachably secured to the top rail 63 of the windshield by any suitable means, such as notched posts or uprights 64 carried by the upper rail and extending into apertures in the bottom face of the front bow, the latter, in the construction illustrated, being constructed of sheet metal and adapted to carry suitable mechanism, not shown, for engagement with the uprights 64 to lock the front bow to the upper rail. Any suitable locking mechanism may be employed as, for example, any one of those presently on the market, the details of which form no part of the present invention.

Figs. 4, 6, 7, and 12 illustrate details of construction of the convertible fabric top and cooperable details of the means for attaching the same to the top structure. The fabric top 65 in general appearance is similar to the hard top illustrated in Fig. 1 with the exception that it will be tensioned over the bows 12, 13, and 14 as well as the padding strips 19 whereby the top will generally conform to the contours of such elements and extend in taut relation therebetween.

In general, those skilled in the art will readily be able to suitably proportion and lay out a top adapted to be applied to the top structure illustrated in Fig. 2, and construct such fabric top with the mounting means herein described.

Referring to Fig. 4, the rear edge 66 of the top 65 is provided with a suitable peripheral bead 67 of a size to enter the channel 68 formed by the retaining strips 57 and the flange 56. Such edge of the top 65 is firmly secured in place by a combination retaining and trim strip 69 which is generally L-shaped in transverse cross section, having an outer portion or leg 71 adapted to overlie the retaining strips 57 and the adjacent portion of the top material therebetween, and a transversely extending leg portion or flange 72 which extends inwardly between the retaining strip 57 and the opposed face 73 of the member 16. The strip 71 may be firmly secured in position by a pair of screws 74, respectively located adjacent each end of the strip, passing through the latter and being threaded into suitable bores 75 in the flange 56. The proportions of the retaining strip with relation to the strips 57, face 73 of the member 16, and flange 56 are such that the strip 69 prevents withdrawal of the bead 67 from the channel 68, thereby firmly securing the rear edge of the top of the rear window. The front edge of the top 65 may be suitably secured to the front bow 11 as illustrated in Figs. 6 and 7 wherein the front bow 11 is provided with a suitable channel 76 adapted to receive a suitable projection or bead 77 extending along the inner face of the top 65 adjacent the front edge thereof, the top, if desired, being provided at its front edge with a suitable resilient sealing roll 78 and trim molding strip 79 whereby the front of the top presents an appearance similar to present convertible tops. The member 77, strip 78, and molding 79 may be secured to the top fabric by any suitable means as, for example, stitching, stapling, or the like.

As illustrated in Fig. 6, attached to each end of the member 77 is a suitable retaining member which in the embodiment illustrated comprises a tension spring 81, the latter being adapted to be secured at its free end to a suitable hook-like projection 82, or other means, mounted on the side frame member 19b. The members 81 and member 77 are so constructed that the member 77 will be firmly seated in the channel 76 in the front bow, and will firmly retain the front edge of the top in position under operating conditions to which it may be subjected. The bottom side portions 83 illustrated in Fig. 12 and adapted to extend from the rear window 6 to the rear of the quarter window 4 may be fastened to the car body by any suitable means as, for example, a plurality of snap fasteners 84 comprising a female member 85 attached to the top fabric which, as illustrated, may be folded back upon itself adjacent its lower edge to form a finished edge portion with the fasteners 85 being cooperable with respective male members 86 carried by the vertically extending portion 87 of the body. In the embodiment illustrated in Fig. 2, two such fasteners are shown and as present designs tend to reduce the distance between the rear portion of the quarter window and the front edge of the rear window as, for example, in present hardtops, a top proportioned to present styling would probably require one or no fastener at this point.

It will be apparent from the above description that the fabric or convertible top 65 may be readily attached to or detached from the top structure, the top being detached along its rear edge from the member 16 by removing the screws 74 and retaining strip 69, following which the bead 67 may be readily withdrawn from the channel 68. In like manner, the front edge of the top 65 may be detached from the front bow 11 by disconnecting the retaining members 81 from the cooperable members 82, following which the bead or projection 77 may be withdrawn from the channel 76.

The hardtop 7 may be constructed of metal or other suitable material, which is suitably formed into the proper shape whereby the same generally conforms to the front bow 11, member 16 of the rear window, and side frame members 9a and 9b of the top structure. As illustrated in Fig. 9, the edge portions of the top 7 adjacent the windshield, the door windows 3, and quarter windows 4 may be provided with a suitable drain gutter 88 in a manner similar to those provided on the usual hardtop or closed models, and, if desired, a suitable rubber or other sealing strip 89 may be provided adjacent the inner face of the top along the corresponding peripheral edges thereof as illustrated in Fig. 9, such sealing strip being adapted to bear on the side frames 9a and 9b with the strip preferably extending along the member 87 as illustrated in Fig. 11 whereby the corresponding edges of the top are effectively sealed against the weather. The sealing strip 89 may be secured to the top 7 by any suitable means, such as an adhesive or by means of suitable retaining members secured to the inner face of the top.

The front edge of the top 7 is secured to the bow 11 by suitable means, such as a plurality of inwardly extending plate-like projections 91 and 92, each member 91 being positioned adjacent one of the outer uprights 64 and the member 92 adjacent the center upright 64 with the respective members 91 and 92 extending through corresponding slots 93 in the front bow 11, the slots 93, in the construction illustrated, intersecting the channel 76 in the front face of the bow.

The bottom side edges of the hardtop adjacent the member 87 of the body will snugly seat thereon and, in normal cases, will need no additional securement. However, if desired, means could, for example, be secured to the inner face of the top 7 for cooperation with the fastener or fasteners 86 on the member 87.

As illustrated in Fig. 10, the rear edge portion 94 is provided with a transversely extending portion 95, the free edge of which is provided with flange means 96 which may be continuous or may be a series of laterally spaced flanges, whereby the hardtop may be positioned on top of the retaining strip 57 with the portion 95 extending downwardly between the strip 57 and the face 73. The top 7 may be held in position by the strip 69 and screws 74, the flange portions 96 of the top underlying the flanged edge 72 of the strip 69.

The interior of the hardtop 7 may be finished off in any desired manner as, for example, flocking, or provided with a fabric, plastic, or other applied lining material, and, if desired, the inner face of the top may be provided with cushioning material adapted to engage the bows 12, 13, and 14 whereby the top 7 is securely seated on the top structure.

The tops may be installed upon and removed from the vehicle in the following manner:

Assuming the top structure is as illustrated in Fig. 2, to apply the convertible top the latter is placed over the top structure and the rear edge fastened to the member 16 of the rear window. Such fastening may be accomplished by inserting the bead or rib 67 in the channel 68 and mounting the trim strip 69, the latter readily assuming the general position illustrated in Figs. 1 and 4, and secured in place by a screw 74 at each end of the strip. The top structure is then partially lowered by means of the power mechanism associated therewith, the lowering action required being merely that sufficient to remove tension from the padding strips 19 so that the front edge of the convertible top 65 may be readily positioned on the front bow 11 without tensioning of the top material. After the bead or rib 77 has been positioned in the channel 76, the retaining members 81 may be engaged with their cooperable stationary member 82, thereby tensioning the front edge of the top 65 across the bow 11 and firmly anchoring the front edge of the top thereto. The top structure may then be returned to its fully raised position and the snap fasteners 84 engaged to complete the installation.

The top may be lowered in substantially the same manner as present convertible top structures, any latch members 51, however, being disengaged from the members 49 to permit the rear window 6 to drop into the well 29. It will be apparent from the reference to Figs. 3 and 5 that the gasket or sealing strip 38 in cooperation with the portion 34 of the member 15 effectively seals the interior of the body from the elements, any water received by the gutter 35 being carried off by the drain tubes 36. However, in the construction illustrated in Fig. 3 wherein the additional sealing strip 42 is provided, little, if any, water will flow into the gutter 35. When it is desired to replace the soft convertible top with the hardtop 7, the convertible top is initially removed in the reverse manner to the installation thereof, the top structure being initially partially lowered to remove tension from the top 65, following which the front edge thereof may be detached from the front bow 11. The strip 69 may then be removed from the member 16 and the rear edge of the top 65 disengaged from the retaining strip 57. The top structure may then be returned to its fully raised position and the hardtop 7 positioned over the same. The members 91 and 92 are then inserted in their respective slots 93, this being accomplished by moving the top 7 forwardly a sufficient distance to permit the insertion of the members 91 and 92, following which the top is moved rearwardly until the rear edge thereof may be engaged with the retaining strip 57 as illustrated in Fig. 10. The strip 69 is then replaced and secured in position by the screws 74 completing the installation.

It will be particularly noted that my invention not only provides interchangeable convertible and hard tops but also provides a convertible top which may be readily removed and replaced by the average person, the convertible top requiring no tacking or other permanent attachment to the vehicle top structure. Thus, with the present invention, a new top may be purchased by the car owner and readily installed by him with the only tool required being a screw driver to remove and replace the screws 74.

It will be apparent from the above description that I have provided a convertible top structure which may employ a rigid rear window readily constructed to provide a wrap-around effect and maximum vision. While I have illustrated the rear window as comprising a plurality of panels spaced by the connecting members 18 by utilizing a sufficiently rigid window structure, the transparent panel may be made as a single continuous member similar to present rear windows. It will also be noted that the present invention enables the utilization of conventional convertible top structures, actuating mechanism, and linkage whereby only relatively minor body design changes may be made, the construction providing a very watertight top and rear window construction.

It will also be apparent that the convertible top construction could be employed to advantage with other rear panel construction.

While I have illustrated various details of construction in connection with the embodiment of the invention illustrated in the drawings, it will be appreciated that different makes of cars as well as various particular body constructions may require variations in the specific physical details of the top and rear window structure. Consequently, the details illustrated in the drawings are merely one example of a typical application of the present invention, and it is believed that the above description will enable anyone skilled in the art to readily adapt the invention to any particular body or top construction.

Having thus described my invention, it is obvious that various immaterial modifications may be made in the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

1. In a convertible body and top structure, the combination of a rear window member of generally arcuate lateral cross sectional shape whereby said window extends across the body to, and partially along the side of the vehicle, said side portions having downwardly depending elements, means pivotally connecting said element to the vehicle body on an axis extending transversely across the vehicle whereby said window may be rotated from a raised position above the adjacent portion of the vehicle body to a lowered position substantially within the vehicle body, cooperable means on the lower edge portion of said rear window and the adjacent peripheral portions of the body for effecting a substantially water-tight joint therebetween when said window is in a raised position, said rear window including a generally U-shaped front member, a top frame structure including side frame members, a front bow member and an intermediate bow member, said front bow member being adapted to be detachably secured to the upper portion of the vehicle windshield, said top frame structure being constructed to fold rearwardly and downwardly into the vehicle body adjacent said rear window, a padding strip at each side of the top frame structure extending from said front bow to said intermediate bow and from the latter to the front member of said rear window with the rear end of each strip secured to said member, a top cover member adapted to overlie said top frame structure and generally conform to the general shape of the latter, said top cover member having means along the front portion thereof cooperable with means on said front bow for operatively connecting the same together, and said top cover member having means along the rear edge thereof cooperable with means on the front member of said rear window for detachably securing said cover member thereto.

2. In a convertible body and top structure, the combination of a rear window member of generally arcuate lateral cross sectional shape whereby said window extends across the body to, and partially along the sides of the vehicle, the side portions having downwardly depending elements, means pivotally connecting said elements to the vehicle body on an axis extending transversely across the vehicle whereby said window may be rotated from a raised position above the adjacent portion of the vehicle body to a lowered position substantially within the vehicle body, cooperable means on the lower edge portion of said rear window and the adjacent peripheral portions of the body for effecting a substantially water-tight joint therebetween when said window is in a raised position, gutter means associated with said lower edge portion of said window including a drain tube for carrying off water accumulating in said gutter, said rear window including a generally U-shaped front member, a top frame structure including side frame members, a front bow member and an intermediate bow member, said front bow member being adapted to be detachably secured to the upper portion of the vehicle windshield, said top frame structure being constructed to fold rearwardly and downwardly into the vehicle body adjacent said rear window, a padding strip at each side of the top frame structure extending from said front bow to said intermediate bow and from the latter to the front member of said rear window with the rear end of each strip secured to said member, a top cover member adapted to overlie said top frame structure and generally conform to the general shape of the latter, said top cover member having means along the front portion thereof cooperable with means on said front bow for operatively connecting the same together, and said top cover member having means along the rear edge thereof cooperable with means on the front member of said rear window for detachably securing said cover member thereto.

3. In a convertible body and top structure, the combination of a rear window member of generally arcuate lateral cross sectional shape whereby said window extends across the body to, and partially along the sides of the vehicle, said side portions having downwardly depending elements, means pivotally connecting said elements to the vehicle body on an axis extending transversely across the vehicle whereby said window may be rotated from a raised position above the adjacent portion of the vehicle body to a lowered position substantially within the vehicle body, cooperable means on the lower edge portion of said rear window and the adjacent peripheral portions of the body for effecting a substantially water-tight joint therebetween when said window is in a raised position, gutter means associated with said lower edge portion of said window including a drain tube for carrying off water accumulating in said gutter, said rear window including a generally U-shaped front member having channel means formed therein, a top frame structure including side frame members, a front bow member and an intermediate bow member, said front bow member being adapted to be detachably secured to the upper portion of the vehicle windshield, said top frame structure being constructed to fold rearwardly and downwardly into the vehicle body adjacent said rear window, a padding strip at each side of the top frame structure extending from said front bow to said intermediate bow and from the latter to the front member of said rear window with the rear end of each strip secured to said member, a top cover member of relatively flexible material adapted to be folded down into the body with said top frame structure, said cover member being of a size and shape to overlie the frame structure and extend between said front bow and said rear window, said front bow having a channel in the front edge portion thereof extending laterally across the vehicle, said top cover member having an inwardly extending rib adjacent the front peripheral edge portion thereof of a size to be seated in the channel in said front bow, spring means associated with each end of said rib for tensioning the latter in said channel to prevent undesired withdrawal thereof, the rear edge of said top cover member being constructed to enter and be positioned in the channel in the front member of said rear window, a strip of material extending along said front member and secured adjacent its ends thereto, said strip being adapted to overlie said channel and the portion of the top cover member positioned therein, said strip being constructed to engage the top cover material within said channel for preventing undesired withdrawal thereof, and means adjacent the bottom peripheral portions of said top cover adjacent the end portions of the front member of said rear window for detachably securing the cover member to that portion of the vehicle body extending from said rear window to the rear portion of said frame structure.

4. In a convertible body and top structure, the combination of a rear window member of generally arcuate lateral cross-sectional shape whereby said window extends across the body to, and partially along the sides of the vehicle, said side portions having downwardly depending elements, means pivotally connecting said elements to the vehicle body on an axis extending transversely across the vehicle whereby said window may be rotated from a raised position above the adjacent portion of the vehicle body to a lowered position substantially within the vehicle body, cooperable means on the lower edge portion of said rear window and the adjacent peripheral portions of the body for effecting a substantially water-tight joint therebetween when said window is in a raised position, gutter means associated with said lower edge portion of said window including a drain tube for carrying off water accumulating in said gutter, said rear window including a generally U-shaped front member having channel means formed therein, a top frame structure including side frame members, a front bow member and an intermediate bow member, said front bow member being adapted to be detachably secured to the upper portion of the vehicle windshield, said top frame structure being constructed to fold rearwardly and downwardly into the vehicle body adjacent said rear window, a padding strip at each side of the top frame structure extending from said front bow to said intermediate bow and from the latter to the front member of said rear window with the rear end of each strip secured to said member, a top cover member of relatively flexible material adapted to be folded down into the body with said top frame structure, said cover member being of a size and shape to overlie the frame structure and extend between said front bow and said rear window, said front bow having a channel in the front edge portion thereof extending laterally across the vehicle, said top cover member having an inwardly extending rib adjacent the front peripheral edge portion thereof of a size to be seated in the channel in said front bow, means associated with each end of said rib for tensioning the latter in said channel to prevent undesired withdrawal thereof, the rear edge of said top cover member being constructed to enter and be positioned in the channel in the front member of said rear window, and a strip of material extending along said front member and secured adjacent its ends thereto, said strip being adapted to overlie said channel and the portion of the top cover member positioned therein, said strip being constructed to engage the top cover material within said channel for preventing undesired withdrawal thereof.

References Cited in the file of this patent

UNITED STATES PATENTS

| | | |
|---|---|---|
| 1,298,836 | Vetter | Apr. 1, 1919 |
| 1,373,207 | Shaw | Mar. 29, 1921 |
| 2,141,842 | Lohrman | Dec. 27, 1938 |
| 2,511,460 | Cancelli et al. | June 13, 1950 |
| 2,580,337 | Votypka | Dec. 25, 1951 |
| 2,596,309 | Urich | May 13, 1952 |
| 2,704,225 | Anschuetz | Mar. 15, 1955 |
| 2,747,923 | McLean | May 29, 1956 |
| 2,772,114 | Hennessey | Nov. 27, 1956 |

FOREIGN PATENTS

| | | |
|---|---|---|
| 1,049,026 | France | Dec. 28, 1953 |